United States Patent
Hirano et al.

(10) Patent No.: US 7,514,060 B2
(45) Date of Patent: Apr. 7, 2009

(54) POROUS POTASSIUM CARBONATE HAVING SPECIAL PORE STRUCTURE AND METHOD FOR ITS PRODUCTION

(75) Inventors: Hachiro Hirano, Chiba (JP); Yasunori Yamaguchi, Chiba (JP); Minako Okamura, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 843 days.

(21) Appl. No.: 10/873,283

(22) Filed: Jun. 23, 2004

(65) Prior Publication Data
US 2004/0265206 A1 Dec. 30, 2004

(30) Foreign Application Priority Data
Jun. 24, 2003 (JP) .............................. 2003-179784

(51) Int. Cl.
*C01D 7/12* (2006.01)
(52) U.S. Cl. ....................... 423/421; 423/427
(58) Field of Classification Search ................. 423/421, 423/427; 502/400, 427
See application file for complete search history.

(56) References Cited

U.S. PATENT DOCUMENTS

| 4,366,179 A | * | 12/1982 | Nawata et al. | ............... 426/395 |
| 4,895,819 A | * | 1/1990 | Drake | ......................... 502/174 |
| 5,449,506 A | | 9/1995 | Berry et al. | |
| 6,352,653 B1 | * | 3/2002 | Hirano et al. | ............... 252/189 |

FOREIGN PATENT DOCUMENTS

| JP | 9-188690 | | 7/1997 |
| JP | 10-279535 | | 10/1998 |
| JP | 11-104439 | | 4/1999 |
| JP | 2003-192337 | * | 7/2003 |

* cited by examiner

*Primary Examiner*—Stuart L. Hendrickson
*Assistant Examiner*—Daniel C. McCracken
(74) *Attorney, Agent, or Firm*—Oblon, Spivak, McClelland, Maier & Neustadt, P.C.

(57) ABSTRACT

A method for producing a porous potassium carbonate, which comprises calcining potassium hydrogen carbonate crystals having a mean particle diameter of from 100 to 1,000 μm at a temperature of the object to be calcined of from 100 to 500° C., while introducing a dry gas which has a dew point of not higher than 0° C. and a temperature of from 10 to 50° C.

5 Claims, 1 Drawing Sheet

POROUS POTASSIUM CARBONATE HAVING SPECIAL PORE STRUCTURE AND METHOD FOR ITS PRODUCTION

BACKGROUND OF THE INVENTION

1. Field of the Invention

The present invention relates to a porous potassium carbonate having a special pore structure and a method for its production.

2. Discussion of Background

Potassium carbonate has a broad range of applications including e.g. production of special glass, soaps or detergents, in the food industry for salt water (ramen noodles additive), and production of pigments. Further, it is often used as a catalyst or a raw material of intermediate ingredients for producing organic chemicals. In such applications, it is desired to provide potassium carbonate having a high velocity of dissolution or a higher activity with respect to its reactivity. For example, JP-A-10-279535 and JP-A-9-188690 disclose to use a potassium carbonate powder having a limited particle diameter and a large specific surface area, but it is still desired to further improve the activity with respect to the reactivity.

Potassium carbonate is mainly produced by two methods, i.e. a direct method to obtain potassium carbonate directly, and a potassium hydrogen carbonate method wherein potassium hydrogen carbonate is firstly obtained and then it is decomposed by calcination to obtain potassium carbonate.

As the direct method, there is a method wherein a carbon dioxide-containing gas is reacted with an aqueous potassium hydroxide solution to obtain potassium carbonate, which is then concentrated to obtain potassium carbonate 1.5 hydrate ($K_2CO_3 \cdot 1.5H_2O$), which is then calcined to obtain potassium carbonate. This direct method requires only a small number of instruments for production equipments and has a good productivity, and thus, it has been widely employed. However, in this method, tiny particles (dust) will often be formed at the time of drying after obtaining hydrated potassium carbonate crystals, whereby their handling tends to be difficult. Therefore, it is known to spray the aqueous potassium hydroxide solution directly to the inside of a fluidized bed dryer, and enter a heated carbon dioxide-containing gas thereto, whereby nearly spherical crystals having a high specific gravity can be obtained. However, in potassium carbonate thus obtained by such a method, pores having pore diameters of from 0.1 to 1 µm are hardly observed.

Further, U.S. Pat. No. 5,449,506 discloses a method for obtaining an aqueous potassium carbonate solution directly from potassium chloride by an ion-exchange method. However, the aqueous solution obtained by this method is dilute, whereby it has to go through a concentration process employing large instruments to take out the potassium carbonate, and further, it has been difficult to obtain potassium carbonate crystals having a high activity by the subsequent crystallization.

The potassium hydrogen carbonate method does not have a high productivity like the direct method. However, it is thereby possible to obtain potassium carbonate crystals which are porous and have a large specific surface area, and which have a relatively high activity such as a high reactivity with other chemicals, and a high velocity of dissolution. However, a porous potassium carbonate having a higher activity and a method for its production or manufacturing condition have been unknown.

SUMMARY OF THE INVENTION

It is an object of the present invention to provide a porous potassium carbonate having a special pore structure and a high activity, and a method for its production.

The present invention provides the following.

(1) A method for producing a porous potassium carbonate, which comprises calcining potassium hydrogen carbonate crystals having a mean particle diameter of from 100 to 1000 µm at a temperature of the object to be calcined of from 100 to 500° C., while introducing a dry gas which has a dew point of not higher than 0° C. and a temperature of from 10 to 50° C.

(2) The method for producing a porous potassium carbonate according to (1), wherein the object to be calcined is continuously calcined, while the dry gas is introduced in counter flow to the flow of the object to be calcined.

(3) The method for producing a porous potassium carbonate according to (2), wherein the calcination is carried out in an external heating type rotary kiln.

(4) The method for producing a porous potassium carbonate according to (3), wherein the volume of the dry gas introduced is at least 0.5 m³ (in normal state) per 1 kg of the porous potassium carbonate obtained by calcination.

(5) The method for producing a porous potassium carbonate according to (3), wherein an impact is given from outside of the external heating type rotary kiln to the portion where the potassium hydrogen carbonate becomes potassium carbonate, to prevent sticking of the potassium carbonate.

(6) The method for producing a porous potassium carbonate according to (1), wherein the porous potassium carbonate obtained by calcinations, is pulverized.

(7) The method for producing a porous potassium carbonate according to (1), wherein the total pore-volume of pores having pore diameters of from 0.1 to 1.0 µm is at least 0.08 mL/g.

(8) A method for storaging a porous potassium carbonate, which comprises sealing the porous potassium carbonate obtained by the method as defined in any one of (1) to (7) by a packaging material which is coated with alumina or silica by a vapor deposition method and having a water vapor transmission rate of at most 5 g/(m$^{2.24}$ h) at 40° C. under a difference of relative humidity of 90% RH, as specified in JIS K7129 (Japanese Industrial Standard K 7129-1992. Testing methods for water vapor transmission rate of plastic film and sheeting (instrument method).).

(9) A porous potassium carbonate for raw materials of syntheses of pharmaceuticals, pesticides or industrial chemicals; catalysts to be used for e.g. organic syntheses; pH regulators; or detergents, which has a total pore volume of pores having pore diameters of from 0.1 to 1.0 µm being at least 0.10 mL/g, and a mean particle diameter of from 1 to 30 µm.

(10) A method for producing a porous potassium carbonate, which comprises calcining potassium hydrogen carbonate having a mean particle diameter of at most 30 µm to obtain the porous potassium carbonate as defined in (9).

(11) The method for producing a porous potassium carbonate according to (10), wherein the above potassium hydrogen carbonate is injected into a gas at a temperature of from 100 to 500° C.

(12) A method for storaging a porous potassium carbonate, which comprises sealing the porous potassium carbonate as defined in (9) by a packaging material which is coated with alumina or silica by a vapor deposition method and having a water vapor transmission rate of at most 5 g/(m²·24 h) at 40° C. under a difference of relative humidity of 90% RH, as specified in Japanese Industrial Standard K7129.

DETAILED DESCRIPTION OF THE PREFERRED EMBODIMENTS

Figure 1:
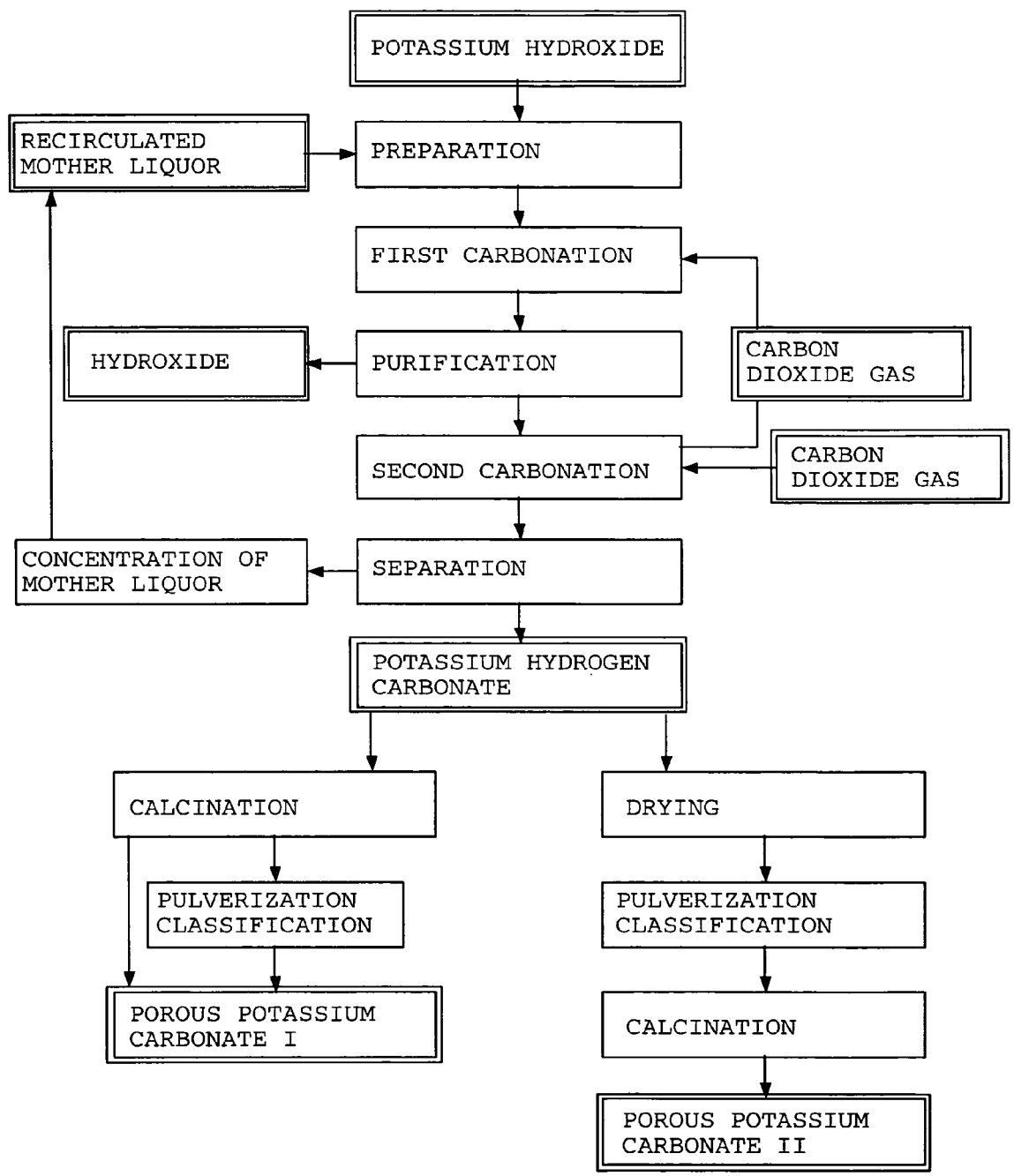
FIG. 1 is a schematic diagram showing a preferred embodiment of the method for producing a porous potassium carbonate in the present invention.

Now, the mode of carrying out the present invention will be described with reference to the drawing. FIG. 1 shows a preferred embodiment of the method for producing a porous potassium carbonate in the present invention.

However, the method of the present invention is not limited to undermentioned examples.

Production of Potassium Hydrogen Carbonate Crystals

Potassium hydrogen carbonate is preferably one which is obtained by reacting an aqueous solution containing potassium hydroxide and/or potassium carbonate with a carbon dioxide-containing gas. In the concrete, reactions shown by the following formulae (1-1) and (1-2), take place.

$$2KOH + CO_2 \rightarrow K_2CO_3 + H_2O \quad (1\text{-}1)$$

$$K_2CO_3 + CO_2 + H_2O \rightarrow 2KHCO_3 \quad (1\text{-}2)$$

Potassium hydrogen carbonate crystals having a mean particle diameter of from 100 to 1,000 μm can be obtained by carrying out the reaction by adjusting the concentration and the liquid temperature of the aqueous solution containing potassium hydroxide and/or potassium carbonate, and further, the concentration of carbon dioxide in the carbon dioxide-containing gas injected into the aqueous solution, preferably to the following conditions. This crystallization process of potassium hydrogen carbonate is referred to as a second carbonation process.

Firstly, the aqueous solution containing potassium hydroxide and/or potassium carbonate preferably has a concentration of from 15 to 53 mass % (percent by mass) as converted into $K_2O$. Here, the concentration as converted into $K_2O$ refers to the concentration (mass %) when all potassium contents (KOH, $K_2CO_3$, $KHCO_3$) contained in the aqueous solution are converted into a concentration of $K_2O$. Further, the concentration of the aqueous solution is more preferably from 20 to 50 mass %, particularly preferably from 30 to 47 mass %, as converted into $K_2O$. When the concentration as converted into $K_2O$ is at least 15 mass %, the amount of potassium hydrogen carbonate crystals to be precipitated per the volume of the aqueous solution will be proper, and such is excellent from the viewpoint of the productivity. When the concentration as converted into $K_2O$ is at most 53 mass %, it will be easy to obtain crystals having a mean particle diameter of from 100 to 1,000 μm.

Here, one of the reasons why large crystals having a mean particle diameter of from 100 to 1,000 μm are required, is that at the process of separating the precipitated potassium hydrogen carbonate crystals from the mother liquor, the adhesion of the mother liquor can be reduced. For example, when potassium hydrogen carbonate crystals and the slurry of the mother liquor are separated by using a centrifugal separator, the amount of the mother liquor adhered on the potassium hydrogen carbonate crystals can be reduced. At that time, the larger the mean particle diameter of the potassium hydrogen carbonate is, the more the adhesion of the mother liquor can be reduced. By reducing the adhesion of the mother liquor, the purity of the obtained crystals can be maintained to be high, whereby drying and calcination in the subsequent processes will be facilitated. The adhesion of the mother liquor is preferably at most 20 mass %, more preferably at most 10 mass % on dry base (the proportion of water to potassium hydrogen carbonate after drying). Accordingly, in order to obtain potassium hydrogen carbonate or potassium carbonate having a mean particle diameter of at most 30 μm, it is advisable firstly to obtain the large potassium hydrogen carbonate crystals having a mean particle diameter of from 100 to 1,000 μm, and then dry and calcine them, followed by pulverization.

When the aqueous solution containing potassium hydroxide and/or potassium carbonate is reacted with the carbon dioxide-containing gas in the second carbonation process, the liquid temperature of the aqueous solution is preferably from 20 to 90° C., more preferably from 40 to 80° C. When the liquid temperature is within such a range, it will be easy to obtain crystals having a mean particle diameter of from 100 to 1,000 μm. Further, if it exceeds 90° C., the portion in contact with the liquid, of the reaction equipment tends to be corroded, whereby impurities in the product tend to increase.

Further, the concentration of the carbon dioxide-containing gas injected into the solution is preferably from 10 to 100 vol % (percent by volume). If the concentration is less than 10 vol %, it takes time for the reaction or the crystallization to proceed, whereby the productivity decreases, such being undesirable. Namely, if the carbon dioxide concentration is low, the proportion of the chemical change of potassium hydroxide and/or potassium carbonate in the raw material liquid (the liquid before second carbonation) to potassium hydrogen carbonate will decrease, and the concentration of potassium carbonate in the mother liquor at the time of completion of the reaction will be high, whereby the yield of potassium hydrogen carbonate crystals per unit volume will decrease. Because the conversion ratio into potassium hydrogen carbonate decrease.

Here, the reaction of the aqueous solution containing potassium hydroxide and/or potassium carbonate with the carbon dioxide-containing gas is preferably carried out by injecting the carbon dioxide-containing gas into the aqueous solution containing potassium hydroxide and/or potassium carbonate without strongly stirring, in order to obtain the crystals having a mean particle diameter of from 100 to 1,000 μm. If it is stirred, the nucleation at the time of crystallization increases, whereby the mean particle diameter of potassium hydrogen carbonate will decrease. It is preferred to continue the injecting till the mean particle diameter of potassium hydrogen carbonate crystals increases to at least 100 μm, more preferably at least 250 μm. In the concrete, it is preferred to inject the gas for from 5 to 20 hours, more preferably from 8 to 12 hours at a flow rate of at least 100 m³/hr (in normal state) (as converted into 100% carbon dioxide gas) to 10 m³ of the aqueous solution containing potassium hydroxide and/or potassium carbonate prepared in the carbonating tower.

Separation/Recirculation

In a separation process, the potassium hydrogen carbonate crystals precipitated by the above method can be separated from the mother liquor by a usual solid-liquid separating operation such as forced filtration method by e.g. a filter press, vacuum filtration method by e.g. an Oliver filter, centrifugation by e.g. a cylindrical centrifugal separator or decanter, or sedimentation method by e.g. a thickener. As the solid-liquid separator, it is preferred to use a centrifugal separator, whereby it is easy to decrease the amount of the mother liquor adhering on potassium hydrogen carbonate crystals. This separated mother liquor is purified through the following process, and then it can be recirculated to the second carbonation process which comprises injecting the carbon dioxide-containing gas for the reaction.

Firstly, the mother liquor is concentrated, and then, potassium hydroxide is added, so that the concentration of potassium hydroxide in the liquid is adjusted to be from 0.01 to 10 mass % as converted into $K_2O$ (from 0.01 to 12 mass % as converted into KOH), more preferably from 0.1 to 5 mass % as converted into $K_2O$ (from 0.1 to 6 mass % as converted into KOH). Here, the obtained aqueous solution will be hereinafter referred to as the mixed solution. In the mother liquor, potassium ions, carbonate ions and hydrogen carbonate ions are present. Hereupon, if potassium hydroxide is added thereto, and the concentration as converted into $K_2O$ of potassium hydroxide in the mixed solution is adjusted to be at least 0.01%, a heavy metal (e.g. nickel, lead, chrome or iron) or magnesium, as an impurity, can be precipitated as a hydroxide and can be removed by the subsequent solid-liquid separation by using e.g. a filter press. This process of removing the heavy metal or the like is referred to as a purification process. It is particularly effective for removing iron. At the same time, magnesium ions can be also removed as a hydroxide in the same manner.

On the other hand, if the concentration of potassium hydroxide in the liquid exceeds 10 mass % as converted into $K_2O$, crystals of the hydroxide of the above precipitated heavy metal or the like tend to be small, such being undesirable in the solid-liquid separation. Accordingly, it is preferred to obtain large crystals of the hydroxide by adjusting the concentration of potassium hydroxide as converted into $K_2O$ to be at most 10 mass %, and adding a portion of the above liquid (mixed solution before filtration) containing seed crystals of the hydroxide of heavy metal or the like to the mother liquor after having potassium hydrogen carbonate crystals separated, to let the hydroxide act as the seed crystals. By obtaining the large crystals of the hydroxide, the solid-liquid separation by e.g. filtration is facilitated. Here, as a method to obtain still larger crystals of the hydroxide, potassium hydroxide is added to the mother liquor having seed crystals of the hydroxide added thereto, and then solid-liquid separation is carried out upon expiration of at least one minute, whereby the crystals become larger during this period, such being preferred.

Further, in a case where the solution mixed solution is subjected to filtration separation by using a filter press, if the concentration of potassium hydroxide as converted into $K_2O$ in the solution exceeds 10 mass %, deterioration of the filter cloth remarkably progresses, such being undesirable. Therefore, it is preferred to provide a process of adjusting the concentration to be at most 10 mass % by injecting a carbon dioxide gas to convert a portion of potassium hydroxide to potassium carbonate before the purification process. Here, if the gas discharged from the crystallization process of potassium hydrogen carbonate. (second carbonation process) is used as the carbon dioxide gas, it is possible to use the carbon dioxide gas effectively. This process is referred to as a first carbonation process.

The concentration of potassium carbonate in the liquid is preferably adjusted to be from 10 to 53 mass %, more preferably from 35 to 50 mass % as converted into $K_2O$, after reaction with the carbon dioxide in the first carbonation process. If the concentration as converted into $K_2O$ is at most 53 mass %, more preferably at most 50 mass %, the viscosity of the slurry can be prevented from becoming too high, such being preferred for the solid-liquid separation in the purification process. On the other hand, the concentration as converted into $K_2O$ is preferably at least 10 mass %, more preferably at least 35 mass %, whereby an unnecessarily large equipment is not required for the production of potassium hydrogen carbonate crystals in the subsequent second carbonation process, such being preferred.

Depending upon the concentration after the solid-liquid separating operation in the above purification process, potassium hydroxide having high purity may further be added thereto. Further, it is preferred to handle the mother liquor and the mixed solution not to contact with outside air so as to prevent foreign particles from entering from outside through the series of operations.

Production Route of Porous Potassium Carbonate I Calcination

When potassium hydrogen carbonate is calcined, it becomes potassium carbonate by driving out carbon dioxide and water vapor by the thermal decomposition as shown in the following formula (2). This process of calcining potassium hydrogen carbonate to form potassium carbonate, is referred to as a calcination process.

$$2KHCO_3 \rightarrow K_2CO_3 + CO_2 + H_2O \qquad (2)$$

By the driving out of carbon dioxide and water vapor from potassium hydrogen carbonate crystals, pores are formed. By controlling the specific surface area and the volume of such pores, it is possible to obtain potassium carbonate having high activity. Here, the structure of the pores formed by calcination largely depends on e.g. the crystal size of potassium hydrogen carbonate, the adhesion of moisture, and the temperature, the temperature rising rate, the retention time and the composition of the atmosphere gas in the calcination process, etc. and it is indispensable to control these conditions well for obtaining a porous potassium carbonate having the special pore structure and having high reactivity or velocity of dissolution.

In order to let good pores be formed, the particle diameter of potassium hydrogen carbonate crystals before calcination is required to be from 100 to 1,000 μm, preferably from 250 to 550 μm, particularly preferably from 300 to 500 μm. If it is less than 100 μm, it is difficult to carry out the solid-liquid separation after crystallization, whereby a potassium hydrogen carbonate cake having a too high water content has to be put in the calciner, and a porous potassium carbonate having high activity can not be obtained. On the contrary, if the mean particle diameter exceeds 1,000 μm, it takes time for calcination, whereby the productivity decreases.

Here, it is necessary to adjust the calcination condition properly in order to let good pores be formed. If potassium hydrogen carbonate crystals are continuously put in a calciner from one side and the calciner is heated, potassium hydrogen carbonate crystals in the calciner will be converted to potassium carbonate by the reaction of the formula (2), which will then be taken out from the other end. At that time, in the calcination process, it is important to suitably set the condition of the atmosphere gas for forming good pores of potassium carbonate crystals. As such a method, it is preferred to introduce a dry gas in a counter flow, namely, in a direction opposite to the flow of the object to be calcined and to purge carbon dioxide and water vapor formed by calcination. The reaction formula (2) is a chemical equilibrium formula. Therefore, it is necessarily to remove carbon dioxide and water vapor to let the reaction proceed to the right hand side of the formula. Here, as the dry gas to be used, nitrogen gas, flue gas or dry air may, for example, be mentioned. The dry air is particularly preferred, since it is readily available and convenient for handling.

The dry gas is required to have a dew point of not higher than 0° C. and a temperature of from 10 to 50° C. If the dew point of the dry gas is higher than 0° C., not only the reaction of formula (2) tends to hardly proceed, but also the porous potassium carbonate obtained by calcination is likely to absorb moisture. The decomposition gas formed at the time of calcination has a high humidity, and by replacing it with the dry gas quickly, moisture absorption of the potassium carbonate can be prevented. Further, by introducing a dry gas having a low temperature, it is possible to decrease the temperature of the porous potassium carbonate which is difficult to handle as it is in the state of a high temperature after calcination. For example, if potassium carbonate stays at a high temperature, plastics such as a polyethylene as a packaging material will be melted at the time of packaging, or potassium carbonate will be caked. Accordingly, the temperature at the time of blowing the dry gas is adjusted to be from 10 to 50° C., whereby potassium carbonate taken out from the kiln will be cooled to facilitate its subsequent handling such as its packaging. Further, the dry gas preferably has a low carbon dioxide concentration. If the concentration of carbon dioxide is high, the reaction of the formula (2) does not proceed to the right hand side. The concentration of carbon dioxide in the dry gas is preferably at most 5%, more preferably at most 1%.

Further, it is necessary to calcine potassium hydrogen carbonate at a temperature of the object to be calcined of from 100 to 500° C. The temperature of the object to be calcined is preferably from 150 to 500° C., more preferably from 200 to 450° C. If the temperature of the object to be calcined is lower than 100° C., the reaction of the formula (2) does not rapidly proceed. On the other hand, if the temperature of the object to be calcined is higher than 500° C., the formed pores are collapsed after completion of the reaction of the formula (2), whereby a porous potassium carbonate having a high activity can not be obtained. The present inventors consider that this phenomenon occurs because by the temperature-rise the mass transfer on the surface of potassium carbonate proceeds excessively so that the pores formed by calcination will be collapsed.

Further, the retention time for the object to be calcined in the calciner is preferably from 1 to 10 hours, more preferably from 2 to 5 hours. In the above temperature range, if the retention time is at least 1 hour, calcination sufficiently proceeds, whereby deterioration of the purity of potassium carbonate due to remaining of unreacted potassium hydrogen carbonate can be prevented. Further, if it is within 10 hours, collapse of the formed pores can be prevented, whereby a porous potassium carbonate having a good pore structure can be obtained.

As the calciner, there may, for example, be an external heating type rotary kiln, an internal heating type rotary kiln, a tunnel kiln or a roller hearth kiln, especially the rotary kiln is preferably used. In the rotary kiln, the powder in the calciner is always rolled, whereby calcination can be uniformly carried out. Further, it is preferred to use an external heating type rotary kiln since it makes easy to control the temperature and the retention time, and the potassium carbonate obtained by the calcination are hardly contaminated by impurities. In a case where the external heating type rotary kiln is used, it is preferred to maintain the heating temperature of the external wall portion of the kiln to be at least 600° C. so as to adjust the temperature of the object to be calcined to a level of from 100 to 500° C.

Further, it is preferred to carry out calcination, while blowing the dry gas in an amount of at least 0.5 m$^3$ (in normal state) per 1 kg of the porous potassium carbonate obtained by the calcination, to the external heating type rotary kiln. When the volume of the inlet dry gas blown is at least 0.5 m$^3$ (in normal state) per 1 kg of the porous potassium carbonate obtained by the calcination, the reaction of the formula (2) will proceed smoothly, and the productivity will be improved, whereby a porous potassium carbonate having a uniform and good pore structure can readily be obtained. The volume of the inlet dry gas is more preferably at least 0.7 m$^3$ (in normal state) per 1 kg of the porous potassium carbonate obtained by the calcination.

In a case where potassium hydrogen carbonate is calcined by the external heating type rotary kiln, at the portion where potassium hydrogen carbonate becomes potassium carbonate, the potassium carbonate is likely to stick on the portion of the inside of the kiln, to hinder the movement of the powder in the inside of the kiln. As a method to prevent this, it is possible to employ a method, which is generally called as returned ash, wherein potassium carbonate as the product is mixed to potassium hydrogen carbonate and put into the kiln. However, pores of the potassium carbonate put into the kiln again, are likely to be collapsed, whereby a porous potassium carbonate having a good pore structure can not be obtained. Accordingly, it is preferred to employ a method, wherein an impact is given from outside of the external heating type rotary kiln to the portion where the potassium hydrogen carbonate becomes potassium carbonate, to prevent sticking of the potassium carbonate. As a method to give the impact from the outside, a movable hammer may be provided on or near the rotating cylinder of the kiln (the shell cylinder) to automatically impact the rotating cylinder of the kiln. The frequency of impacting the rotating cylinder of the kiln is preferably at least once, more preferably at least twice, during one rotation of the kiln. Further, it is effective to make the inner surface of the kiln in contact with potassium carbonate flat and smooth.

Pulverization/Classification

By the above method, a porous potassium carbonate having a high activity can be obtained. However, it is further possible to pulverize it to further enlarge the specific surface area of particles or increase the number of particles per a unit mass, in order to further improve the activity for the reaction or dispersibility in the reactant or the solvent.

A mean particle diameter of the porous potassium carbonate of from 1 to 30 μm is preferable and 1 to 20 μm is more preferable. If a mean particle diameter is less than 1 μm, it tends to coagulate.

As the pulverization method, a usual pulverization method may be employed such as pulverization by an impact pulverizer (a pulverizer using e.g. vertical grooved hammers, bar type hammers or pin type hammers which rotate at high-speed), pulverization by a jet mill (a pulverizer by means of collision flow), milling by a ball mill or wet milling in a solvent which does not substantially dissolve potassium carbonate. It is particularly preferred that an impact pulverizer equipped with a pneumatic classifier is used, therefore the particles discharged from the pulverizer are classified, and pulverization is carried out while coarse particles are returned to the pulverizer, whereby a porous potassium carbonate having a desired particle diameter can be obtained in good yield. Further, it is also preferred to use a jet mile, as it is suitable for pulverization into fine particles since it is not required to remove the coarse particles by sieving, and a porous potassium carbonate having a desired particle diameter can be obtained in good yield. Further, it is preferred to carry out the pulverization in a dry gas which has a dew point of not higher than 0° C. and a temperature of from 10 to 50° C., in order to prevent moisture absorption during the pulverization. As the dry gas, nitrogen gas or dry air may preferably be used.

The porous potassium carbonate obtained by calcination (followed by pulverization and classification) of the above potassium hydrogen carbonate having a mean particle diameter of from 100 to 1,000 μm, is characterized by having a large number of special pores. It has a large number of pores having pore diameters of from 0.1 to 1 μm, which are hardly observed in potassium carbonate produced by a direct method which comprises reacting potassium hydroxide and carbon dioxide in a fluidized bed to obtain potassium carbonate. In addition, the larger the pore volume per unit mass is, the higher the activity of potassium carbonate becomes. Accordingly, the total volume of pores having pore diameters of from 0.1 to 1.0 μm is preferably at least 0.08 mL/g, more preferably at least 0.1 mL/g. Here, mL means milliliter which is a unit of volume. The present inventors consider that as pores having pore diameters of from 0.1 to 1 μm develop, the mass transfer of a gas or liquid as a reactant in pores of potassium carbonate is facilitated, the reaction activity or the velocity of dissolution of potassium carbonate is improved. The inventors consider that in a case of microscopic pores having pore diameters of less than 0.1 μm, the velocity of the mass transfer of a gas or liquid as a reactant becomes slow, whereby the reaction activity or the velocity of dissolution deteriorates even if the specific surface area is large.

Production Route of Porous Potassium Carbonate II

Now, a porous potassium carbonate having a better pore structure with a mean particle diameter of from 1 to 30 μm and its production method, will be explained. Here, as potassium hydrogen carbonate, a commercially available potassium hydrogen carbonate may be employed other than one obtained by drying (not calcination) the potassium hydrogen carbonate obtained in the crystallization process of the above method.

Pulverization/Classification

A method of finely pulverizing potassium hydrogen carbonate, followed by calcination, is preferably employed. As the potassium hydrogen carbonate, it is preferred to use one pulverized to have a mean particle diameter of at most 30 μm. It is thereby possible to obtain, through the subsequent calcination process, potassium carbonate having a mean particle diameter of from 1 to 30 μm, and it is possible to improve the reactivity or the dissolution speed by the increase of the specific surface area per unit mass and by the increase of the number of particles per unit mass by the feature of fine particles. A mean particle diameter of the potassium hydrogen carbonate is more preferably at most 20 μm.

As the method for fine pulverization, the same method as in the above-described fine pulverization of potassium carbonate can be employed. The method for pulverization in the above described condition by using an impact pulverizer equipped with a pneumatic classifier, can suitably be used in the same manner as in the case of potassium carbonate. Further, this pulverization is also preferably carried out in a dry gas having a dew point of not higher than 0° C. and a temperature of from 10 to 50° C. so as to prevent moisture absorption and decomposition during the pulverization. As the dry gas, nitrogen gas or dry air can suitably be used.

As the calcination condition, a method of injecting potassium hydrogen carbonate into a heated gas for calcination is preferably employed, as potassium hydrogen carbonate is fine particles. The gas temperature is preferably from 100 to 500° C., more preferably from 110 to 500° C., furthermore preferably from 130 to 500° C. If the temperature is at least 100° C., the reaction time to convert potassium hydrogen carbonate to potassium carbonate can be shortened, whereby the deterioration of the purity of the potassium carbonate due to the remaining of the unreacted potassium hydrogen carbonate can be prevented. If the temperature is at most 500° C., collapse of pores formed can be prevented, whereby a porous potassium carbonate having a good pore structure can easily be obtained.

As the gas to be used for calcination, it is possible to use not only one having air or nitrogen gas heated, but also a combustion exhausted gas can be used. The calcination time is preferably from 0.1 second to 10 hours. The calcination time is the retention time in the heating gas, and it depends on the particle diameter of potassium hydrogen carbonate or the gas temperature. In a case where the calcination temperature exceeds 450° C., the calcination time is preferably within 1 hour so as to prevent the collapse of pores.

For collection of the fine potassium carbonate particles of at most 30 μm obtained by calcination, a dust collector such as a bag filter, a cyclone separator or an electric precipitator may be used.

Further, as an embodiment wherein the porous potassium carbonate of the present invention having a good pore structure with a mean particle diameter of at most 30 μm, is used for the reaction with an acidic gas, there is a method wherein the acidic gas to be used for the reaction is heated, and potassium hydrogen carbonate pulverized to at most 30 μm is sprayed thereto, to carry out formation of potassium carbonate and the reaction with the acidic gas in the same process.

By the above-mentioned method of pulverizing potassium hydrogen carbonate, followed by calcination, it is possible to obtain a porous potassium carbonate having a mean particle diameter of from 1 to 30 μm. wherein the total pore volume of pores having pore diameters of from 0.1 to 1 μm is at least 0.10 mL/g. By the above-mentioned method of calcining potassium hydrogen carbonate of from 100 to 1,000 μm, followed by pulverization to at most 30 μm, the total pore volume of pores having pore diameters of from 0.1 to 1 μm decreases by the pulverization. By the method of finely pulverizing potassium hydrogen carbonate, followed by calcination, it is possible to avoid the reduction of the pore volume of pores having pore diameters of from 0.1 to 1 μm. By employing the method for producing potassium carbonate by pulverizing potassium hydrogen carbonate, followed by calcination, the total pore volume of pores having pore diameters of from 0.1 to 1 μm can be made to be at least 0.10 mL/g, more preferably at least 0.15 mL/g, whereby a better pore structure can be obtained.

The porous potassium carbonate of the present invention has a large specific surface area, whereby it tends to absorb moisture. If it absorbs moisture, the anhydrous potassium carbonate will be a hydrate, and further, the pore structure will change, whereby the reactivity will decrease. A linear low-density polyethylene (hereinafter referred to as a LLDPE film) is usually used for packaging of potassium carbonate, but it has water vapor permeability and is not suitable for storage of a porous potassium carbonate for a long period.

Accordingly, it is preferred to seal it by a packaging material having a vapor transmission rate of at most 5 g/(m$^2$·24 hr) at 40° C. under a difference of relative humidity of 90% RH, as specified in JIS K7129 (Japanese Industrial Standard K7129) (Testing method for water vapor transmission rate of plastic film and sheeting (instrument method), Establizhed Aug. 1, 1992, Reaffirmed 1999). Namely, the vapor transmission amount for 24 hours per 1 m$^2$ is preferably at most 5 g, more preferably at most 3 g/(m$^2$·24 hr), furthermore preferably at most 1 g/(m$^2$·24 hr).

As a packaging material having a low vapor transmission rate or a moisture-proof property, a resin sheet which is coated with alumina or silica by a vapor deposition method is preferred for use. As the structure of the sheet, it is preferred to use a resin sheet wherein as the outermost layer, a polyethylene terephthalate film (hereinafter referred to as a PET film) having a transparent deposition layer of alumina provided for moisture-proof, is used with the deposition layer located inside, as an intermediate layer, a nylon film may be used for improvement of tearing strength as the case requires, and as the innermost layer, a LLDPE film is dry-laminated. As the moisture-proof layer, an aluminum thin film or an aluminum-deposited polyethylene, is available but such is not transparent, and further, it causes troubles in metal detection after packing. Further, a vinylidene chloride coated film is used as a moisture-proof layer, but it contains chlorine and generates a hydrogen chloride gas when incinerated at the time of disposal of packaging bags, such being undesirable. If the PET film having alumina or silica deposited is used as a moisture-proof layer, it is transparent, and a metal detector can be used, and further, no hydrogen chloride will be formed at the time of incineration, such being preferred. The vapor deposition method may be a PVD (Physical Vapor Deposition) method, as well as a CVD (Chemical Vapor Deposition) method. The base material may be a biaxial oriented nylon (ON) as well as PET. Further, the LLDPE film of the innermost layer directly contacts the product, and it is preferred to use a completely additive-free LLDPE without containing e.g. an antioxidant which causes e.g. coloring of the product. The LLDPE may be a low density polyethylene, but it is more preferably LLDPE, since it is excellent in the heat seal strength.

The porous potassium carbonate having a good pore structure of the present invention is good in e.g. reactivity with chemicals or dissolution speed in water, and has a high activity, and thus is preferably used for various applications such as raw materials of syntheses of pharmaceuticals, pesticides or industrial chemicals, catalysts to be used for e.g. organic syntheses, food additives such as salt water (ramen noodles additive), photographic developers, color formers, pH regulators, acid absorbents, detergents, dehumidification agents, acidic gas absorbents, halogen gas absorbents, boric acidic gas absorbents or raw materials for glass.

If it is used as the raw materials of syntheses of pharmaceuticals, pesticides or industrial chemicals, the reactivity of the synthetic reaction will be high by the special pore structure having large pore diameters and specific surface area, and further, the reaction time can be shortened. If it is used as a catalyst for e.g. an organic synthesis, by the special pore structure, not only the reactivity of the synthetic reaction will be high, and the reaction time can be shortened in the same manner, but also the amount of potassium carbonate itself can be reduced. If it is used for salt water or a photographic developer, the velocity of dissolution will be high, whereby the commercial value can be improved. If it is used as a pH regulator, it will be excellent in the reactivity with an acid as shown in Examples. If it is used as an acid gas absorbent, a halogen gas absorbent or a boric acid gas absorbent, it will be excellent in the reactivity with such an acidic gas. If it is used as a detergent, a surface active agent can be impregnated thereon since it is porous, and thus, it is suitable as a material for a household detergent which is dry blended. If it is used as a dehumidification agent, it will be excellent in the performance of moisture absorption. If it is used as a raw material for glass, it will be excellent in the melting property in a glass melting furnace.

EXAMPLES

Example 1 (The Present Invention)

Now, the present invention will be described with reference to the following Example. An aqueous solution containing potassium hydroxide and potassium carbonate, in which the concentration of potassium as a whole was 37 mass % as converted into $K_2O$ (mass %), of which the concentration of potassium hydroxide was 18 mass % as converted into $K_2O$, was put into a reactor, and then the liquid temperature was adjusted to 70° C. A carbon dioxide containing gas having a concentration of 40 vol % was injected thereinto at 12 $m^3$/min (in normal state) from the bottom of the reactor, whereupon potassium hydrogen carbonate crystals were crystallized and grown. After eight hours, a slurried content in the reactor was withdrawn and subjected to centrifugation to take out the potassium hydrogen carbonate crystals. The potassium hydrogen carbonate cake thus obtained was 4,500 kg, the amount of adhered moisture was 4 mass % on dry base (the proportion of the moisture to the potassium hydrogen carbonate after drying), and the mean particle diameter was 400 μm.

Then, comes a calcination process. The potassium hydrogen carbonate cake was put into an external heating type rotary kiln having the heating temperature of the outside wall portion of the kiln adjusted to 880° C., at a rate of 10 kg/min. At that time, the temperature of the object to be calcined was 400° C. At that time, a dry air having a dew point of −5° C. and a temperature of 30° C. was continuously supplied at a flow rate of 10 $m^3$/min (in normal state), to flow in a counterflow to the flow of the object to be calcined, from the outlet for potassium carbonate as the product to the inlet. The volume of the dry air introduced was 1 $m^3$ (in normal state) per 1 kg of potassium carbonate obtained by calcination. Further, the retention time of the object to be calcined was 2 hours. From outside of the kiln, an impact was given by a movable hammer at a frequency of three times during one rotation of the kiln. The temperature of the obtained porous potassium carbonate taken out from the outlet was cooled to 50° C.

Further, comes a pulverization/classification process. A part of the porous potassium carbonate taken out was pulverized by an impact pulverizer (ACM pulverizer ACM-5 model: manufactured by Hosokawamicron corporation) equipped with a pneumatic classifier. This pulverization was carried out in a dry air having a dew point of −10° C. The properties of the porous potassium carbonate were as shown in Table 1.

Further, the measurement of the mean particle diameter with respect to the pulverized product was carried out by using a laser diffraction scattering particle size distribution measuring apparatus (Microtrack FRA9220: manufactured by Nikkiso Co., Ltd.), and the measurement with respect to the non-pulverized product was carried out by using a Ro-Tap Sieve Shaker. The measurement of the specific surface area was carried out by a nitrogen adsorption method by using Rapid Surface Area Apparatus SA-1000 (manufactured by Shibata Scientific Technology Ltd.). Further, the measurement of the pore volume was carried out by using Micromeritics Pore Sizer 9310 (manufactured by Shimadzu Corporation, measuring range: pore diameter of from 0.0071 to 609.5 μm) by a mercury intrusion method.

Further, the reactivity with an acid was measured as an index for the activity as an alkaline catalyst of the obtained porous potassium carbonate. With respect to the reactivity with an acid, 4.0 g of potassium carbonate was put into 400 g of a 0.5% hydrochloric acid aqueous solution adjusted to 25° C., and the reactivity was evaluated by the time to reach pH 5.

TABLE 1

| Items | Unit | Non-pulverized product | Pulverized product |
|---|---|---|---|
| Mean particle diameter | μm | 340 | 12.3 |
| Specific surface area | m²/g | 1.25 | 2.76 |
| Pore volume | mL/g | 0.492 | 2.015 |
| Pore volume of pores having pore diameters of from 0.1 to 1.0 μm | mL/g | 0.119 | 0.087 |
| Time to reach pH 5 by reaction with hydrochloric acid aqueous solution | sec | 10.5 | 6.1 |

Example 2 (Comparative Example)

The operation was carried out in the same manner as in Example 1 except that the heating temperature of the outside wall portion of the kiln was adjusted to 1,200° C. to obtain potassium carbonate. The temperature of the object to be calcined at the time of calcination was 830° C. A part of the potassium carbonate was pulverized and evaluated in the same manner as in Example 1.

TABLE 2

| Items | Unit | Non-pulverized product | Pulverized product |
|---|---|---|---|
| Mean particle diameter | μm | 400 | 14.5 |
| Specific surface area | m²/g | 0.24 | 1.23 |
| Pore volume | mL/g | 0.180 | 1.387 |
| Pore volume of pores having pore diameters of from 0.1 to 1.0 μm | mL/g | 0.041 | 0.017 |
| Time to reach pH 5 by reaction with hydrochloric acid aqueous solution | sec | 29.4 | 10.4 |

Potassium carbonate of Example 2 is porous, but each of the specific surface area, the pore volume and the pore volume of pores having pore diameters of from 0.1 to 1.0 μm is smaller than that of potassium carbonate of Example 1, and further, the reaction with an acid is slow. Accordingly, it is evident that the potassium carbonate crystals in Example 1 has a higher reaction activity.

Example 3 (The Present Invention)

The potassium hydrogen carbonate cake obtained in Example 1 was subjected to drying in an oven for two hours in a 100 vol % carbon dioxide gas at 105° C. This was pulverized by an impact pulverizer equipped with a pneumatic classifier (ACM pulverizer ACM-5 model: manufactured by Hosokawamicron corporation). This pulverization was carried out in a dry air having a dew point of −10° C.

Further, the potassium hydrogen carbonate after the pulverization obtained here was injected into a gas of 200° C. obtained by burning kerosine and then collected by a bag filter to obtain a porous potassium carbonate. The properties of the potassium hydrogen carbonate after the pulverization and the porous potassium carbonate in Example 3 were confirmed to be as shown in Table 3.

TABLE 3

| Items | Unit | Potassium hydrogen carbonate after pulverization | Potassium carbonate |
|---|---|---|---|
| Mean particle diameter | μm | 13.7 | 12.9 |
| Specific surface area | m²/g | 88 | 2.82 |
| Pore volume | mL/g | 0.972 | 2.693 |
| Pore volume of pores having pore diameters of from 0.1 to 1.0 μm | mL/g | 0.003 | 0.195 |
| Time to reach pH 5 by reaction with hydrochloric acid aqueous solution | sec | — | 5.9 |

As compared with the pulverized product in Table 1, the pore volume of pores having pore diameters of from 0.1 to 1.0 μm and the specific surface area are further increased, and the time to reach pH 5 by the reaction with hydrochloric acid aqueous solution was also shortened. Thus, it is evident that by the method of finely pulverizing potassium hydrogen carbonate, followed by calcination, a porous potassium carbonate having a better pore structure can be obtained.

Example 4 (The Present Invention)

25 kg of the pulverized product of the porous potassium carbonate having a mean particle diameter of 12.3 μm produced in Example 1, was weighed, packaged by a moisture-proof packaging material, followed by heat-sealing, and then, left in storage for three months, whereupon the amount of moisture absorption was evaluated.

As the moisture-proof packaging material, a resin sheet was used which was obtained by dry laminating an outermost layer for moisture-proof, made of a 12 μm PET film having a transparent deposition layer of alumina formed by a PVD method, with the deposition layer inside, an intermediate layer for improvement of the tearing strength, made of a 15 μm nylon film, and an innermost layer made of a 70 μm completely additive-free LLDPE film. The size of this packaging bag is 710 mm in length, and 490 mm in width. The vapor transmission rate, as specified in Japanese Industrial Standard K7129, of this packaging material was 0.2 g/(m²·24 hr) at 40° C. under a difference of relative humidity of 90% RH.

As the amount of moisture absorption, the mass reduction (hereinafter referred to as the ignition loss) of potassium carbonate at the time of heating it for 1 hour at 550° C. was measured. The ignition loss was less than 0.1%. Further, the ignition loss of the porous potassium carbonate before packaging was less than 0.1%.

Example 5 (Comparative Example)

The moisture absorption amount after the porous potassium carbonate was left in storage for 3 months, was evaluated in the same manner as in Example 4 except that the packaging material was changed to a LLDPE film. This packaging material was 80 μm in thickness. The vapor transmission rate, as specified in Japanese Industrial Standard K7129, of this packaging material was 6.8 g/(m²·24 hr) at 40° C. under a difference of relative humidity of 90% RH. The ignition loss was 0.6%.

According to the production method of the present. invention, it is possible to obtain a porous potassium carbonate, which is good in e.g. reactivity with chemicals or dissolution speed in water, and has a high activity. Therefore, the porous potassium carbonate of the present invention is preferably used for various applications such as raw materials of syntheses of pharmaceuticals, pesticides or industrial chemicals, catalysts to be used for e.g. organic synthesis, food additives such as salt water, photographic developers, color formers, pH regulators, acid absorbents, detergents, dehumidification agents, acid gas absorbents, halogen gas absorbents, boric acid gas absorbents or raw materials for glass.

The entire disclosure of Japanese Patent Application No. 2003-179784 filed on Jun. 24, 2003 including specification, claims, drawings and summary is incorporated herein by reference in its entirety.

What is claimed is:

1. A method for producing a porous potassium carbonate, the method comprising calcining potassium hydrogen carbonate crystals having a mean particle diameter of from 100 to 1,000 μm at a temperature of the object to be calcined of from 100 to 500° C., while introducing a dry gas which has a dew point of not higher than 0° C. and a temperature of from 10 to 50° C., wherein the object to be calcined is continuously calcined, while the dry gas is introduced in counter flow to the object to be calcined;

the calcination is carried out in an external heating type rotary kiln; and an impact is given from outside of the external heating type rotary kiln to the portion where the potassium hydrogen carbonate becomes potassium carbonate to prevent sticking of the potassium carbonate.

2. The method for producing a porous potassium carbonate according to claim 1, wherein the volume of the dry gas introduced is at least 0.5 m³ (in normal state) per 1 kg of a porous potassium carbonate obtained by calcination.

3. The method for producing a porous potassium carbonate according to claim 1, wherein the porous potassium carbonate obtained by calcination, is pulverized.

4. The method for producing a porous potassium carbonate according to claim 1, wherein the total pore-volume of pores having pore diameters of from 0.1 to 1.0 μm is at least 0.08 mL/g.

5. The method for producing a porous potassium carbonate according to claim 1, further comprising sealing the porous potassium carbonate by a packaging material which is coated with alumina or silica by a vapor deposition method and having a water vapor transmission rate of at most 5 g/(m²·24 h) at 40° C. under a difference of relative humidity of 90% RH, as specified in Japanese Industrial Standard K7129.

* * * * *